(12) United States Patent
Matsumoto et al.

(10) Patent No.: US 9,146,336 B2
(45) Date of Patent: Sep. 29, 2015

(54) SYNTHETIC RESIN LENS

(71) Applicant: YAMAMOTO KOGAKU CO., LTD., Higashiosaka-shi (JP)

(72) Inventors: Kimio Matsumoto, Higashiosaka (JP); Kenta Noda, Higashiosaka (JP)

(73) Assignee: YAMAMOTO KOGAKU CO., LTD., Higashiosaka-shi (JP)

( * ) Notice: Subject to any disclaimer, the term of this patent is extended or adjusted under 35 U.S.C. 154(b) by 0 days.

(21) Appl. No.: 14/349,136

(22) PCT Filed: Sep. 25, 2012

(86) PCT No.: PCT/JP2012/074451
§ 371 (c)(1),
(2) Date: Apr. 2, 2014

(87) PCT Pub. No.: WO2013/054656
PCT Pub. Date: Apr. 18, 2013

(65) Prior Publication Data
US 2014/0320985 A1    Oct. 30, 2014

(30) Foreign Application Priority Data
Oct. 11, 2011   (JP) ................. 2011-224395

(51) Int. Cl.
*G02B 7/02*     (2006.01)
*G02B 3/00*     (2006.01)
*G02C 7/12*     (2006.01)
(Continued)

(52) U.S. Cl.
CPC   *G02B 3/00* (2013.01); *G02B 1/041* (2013.01); *G02C 7/104* (2013.01); *G02C 7/108* (2013.01); *G02C 7/12* (2013.01)

(58) Field of Classification Search
CPC .......................................................... G02B 1/00
USPC ............................................................ 359/722
See application file for complete search history.

(56) References Cited

U.S. PATENT DOCUMENTS

| 7,506,977 | B1 | 3/2009 | Aiiso |
| 2007/0171537 | A1 | 7/2007 | Fung |
| 2008/0284976 | A1* | 11/2008 | Kato et al. ............. 351/163 |

FOREIGN PATENT DOCUMENTS

| CN | 1365454 A | 8/2002 |
| CN | 1541384 A | 10/2004 |

(Continued)

OTHER PUBLICATIONS

International Search Report for International Application No. PCT/EP2009/059685, dated Oct. 26, 2012.

(Continued)

*Primary Examiner* — James Jones
(74) *Attorney, Agent, or Firm* — Heslin Rothenberg Farley & Mesiti P.C.

(57) ABSTRACT

In a synthetic resin lens, a thermoplastic resin is caused to contain a blue pigment having the lowest value for light transmittance in 570-610 nm, and a pink pigment that, among blue light of 380-500 nm, has the highest value for light transmittance in 400-440 nm and the lowest value for light transmittance in 480-520 nm, resulting in a transparent achromatic lens having a lowest value for light transmittance in 570-610 nm. As a result, provided is a synthetic resin lens that, when used in sunglasses, corrective glasses, shields, or the like, has favorable contrast (visibility), few marked color changes when installed, and a natural color.

5 Claims, 1 Drawing Sheet

(51) Int. Cl.
*G02B 1/04* (2006.01)
*G02C 7/10* (2006.01)

(56) References Cited

FOREIGN PATENT DOCUMENTS

| | | |
|---|---|---|
| CN | 1564052 A | 1/2005 |
| CN | 2713500 Y | 7/2005 |
| CN | 1895192 A | 1/2007 |
| CN | 101493532 A | 7/2009 |
| JP | 09-43550 A | 2/1997 |
| JP | 2001-75058 A | 3/2001 |
| JP | 2001-311918 A | 11/2001 |
| JP | 2004-133235 A | 4/2004 |
| JP | 2006-129712 A | 5/2006 |
| JP | 2007-187869 A | 7/2007 |
| JP | 2010-256895 A | 11/2010 |

OTHER PUBLICATIONS

Yamamoto Chemicals Inc. web page, Display materials field, http://yamamoto-chemicals.co.jp/english/products/products01_02/, 1 page.

Kiwa-Chemical Industry web page, KP PLAST, Red 3G, http://kiwa-chemical.co.jp/dye/15plastic/11r-3g/plastic-r-3g-3.html, 1 page.

Office Action issued for corresponding Chinese patent application No. 201280049809.2 dated Jun. 19, 2015.

Extended European Search Report issued for corresponding European patent application No. 12839463.2 dated Jul. 1, 2015.

* cited by examiner

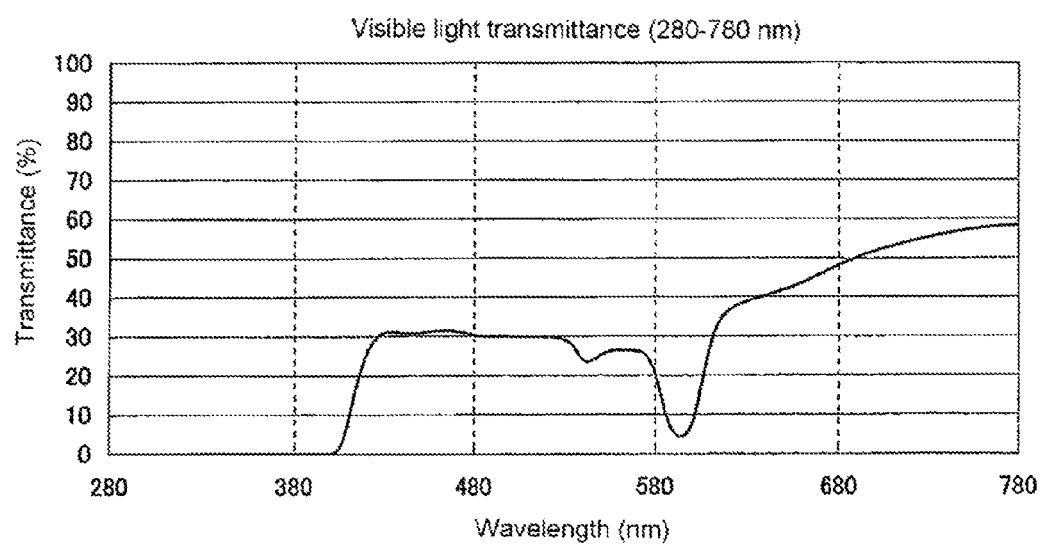

SYNTHETIC RESIN LENS

CROSS REFERENCE TO RELATED APPLICATIONS

This application is a national stage filing under section 371 of International Application No. PCT/JP2012/074451, filed on Sep. 25, 2012, and published in Japanese on Apr. 18, 2013, as WO 2013/054656 A1 and claims priority of Japanese application No. 2011-22439 filed on Oct. 11, 2011, the entire disclosure of these applications being hereby incorporated herein by reference.

TECHNICAL FIELD

The present invention relates to a synthetic resin lens that can be used for sunglasses, corrective glasses, shields, or the like.

BACKGROUND ART

Conventionally, in a lens for glasses (sunglasses, vision correction), there has been a lens that absorbs or reflects light of the wavelength range of blue light from 380 nm to 500 nm, which is readily scattered, among visible light as a lens having a favorable visibility. The lens shields scattered light and, as a result, is sold as a lens having a favorable visibility with which a distant view can be sharply and clearly seen.

Furthermore, in a lens for glasses, an achromatic gray lens exists as a lens that has antiglare effect and exhibits few color changes when the glasses are installed from color seen by naked eyes.

Moreover, as a lens for glasses described in JP H9-43550A, a lens comprising a synthetic resin substrate in which lens the synthetic resin substrate contains an organic pigment having the maximum value of absorption near the center wavelength of the curve of the spectral luminous efficiency of the standard photometric observer, an ultraviolet absorbing agent, and a blue light absorbing agent and has the lowest value of the transmittance curve in a wavelength range of 550 to 585 nm, a transmittance of the lowest value of 25% or less, an average transmittance in the wavelength range of 590 to 660 nm of 15% or more, and an average transmittance in the wavelength range of 470 to 550 nm of 10% or more exists.

SUMMARY OF INVENTION

Technical Problem

However, the conventional lens for glasses which absorbs or reflects light of the wavelength range of blue light has a pink/orange/amber color, since blue light is reduced. The conventional lens thus has problems that color changes when the glasses are installed and when naked eyes are used and that it may be difficult to identify color when the -color of an object is blue.

Furthermore, the conventional achromatic gray lens for glasses almost evenly reduces visible light, and therefore has had a problem that the visibility obtained is equal to or lower than the visibility with naked eyes since the amount of transmitted visible light is reduced.

Moreover, the conventional lens for glasses disclosed in JP H9-43550A reduces glare of the sunlight and can accommodate itself to the lighting of a sodium lamp (the center wavelength is 589 nm) in a tunnel by high transmittance to orange light, however the lens for glasses also has had a problem that there are changes in color when the glasses are installed from color seen by naked eyes.

Accordingly, the object of the present invention is to solve the conventional problems and the present invention has been made to provide a synthetic resin lens that, when used in sunglasses, corrective glasses, shields, or the like, has favorable contrast (visibility), few marked color changes when installed, and a natural color.

Solution to Problem

For the synthetic resin lens of the present invention, a thermoplastic resin is caused to contain a blue pigment having the lowest value for light transmittance in 570 to 610 nm and a pink pigment that, among blue light of 380 to 500 nm, has the highest value for light transmittance in 400 to 440 nm and the lowest value for light transmittance in 480 to 520 nm, resulting in a transparent achromatic lens having the lowest value for visible light transmittance in 570 to 610 nm.

Furthermore, in the synthetic resin lens of the present invention, a sheet obtained by causing a thermoplastic resin to contain a blue pigment having the lowest value for light transmittance in 570 to 610 nm and a pink pigment, among blue light of 380 to 500 nm, having the highest value for light transmittance in 400 to 440 nm and the lowest value for light transmittance in 480 to 520 nm, the sheet having the lowest value for visible light transmittance in 570 to 610 nm, is attached to a transparent thermoplastic resin lens.

Further, in the synthetic resin lens of the present invention, a content rate of the blue pigment is 0.004 to 0.005 wt % and a content rate of the pink pigment is 0.008 to 0.009 wt %.

In the synthetic resin lens of the present invention, a content ratio of the blue pigment to the pink pigment is 1:2.

The synthetic resin lens of the present invention comprises a deposited film reflecting visible light on a surface of the lens.

The synthetic resin lens of the present invention comprises a gray polarizing film having a degree of polarization of 90 to 100% on a surface of the lens.

The synthetic resin lens of the present invention comprises a deposited film reflecting visible light and a gray polarizing film having a degree of polarization of 90 to 100% on a surface of the lens.

The synthetic resin lens of the present invention comprises a deposited film reflecting visible light on a surface of the sheet.

The synthetic resin lens of the present invention comprises a gray polarizing film having a degree of polarization of 90 to 100% on a surface of the sheet.

The synthetic resin lens of the present invention comprises a deposited film reflecting visible light and a gray polarizing film having a degree of polarization of 90 to 100% on a surface of the sheet.

The synthetic resin lens of the present invention is constituted as described above and, when used in sunglasses, corrective glasses, shields, or the like, has favorable contrast (visibility), few marked color changes when installed, and a natural color.

BRIEF DESCRIPTION OF DRAWING

FIG. 1 is a graph showing the visible light transmittance of a synthetic resin lens of the present invention obtained in Example 1.

DESCRIPTION OF EMBODIMENTS

Hereinafter, embodiments for implementing a synthetic resin lens of the present invention will be described in detail.

For the synthetic resin lens of the present invention, a thermoplastic resin is caused to contain a blue pigment and a pink pigment, resulting in a transparent achromatic lens having the lowest value for light transmittance in 570 to 610 nm.

Furthermore, the synthetic resin lens of the present invention is a synthetic resin lens in which a sheet obtained by causing a thermoplastic resin to contain a blue pigment and a pink pigment, the sheet having the lowest value for visible light transmittance in 570 to 610 nm, is attached to a transparent thermoplastic resin lens.

And the visible light transmittance of the lens is preferably set to 10 to 70%, above all, more preferably 20 to 55%.

The thickness of the lens is preferably 1 to 12 mm, more preferably 1.2 to 2.6 mm. It is preferable to make the thickness of the sheet 0.3 to 1.2 mm.

In addition, the "achromatic" range in the present invention is defined as the white range in the color classification of XYZ colorimetric system in JIS Z8110 among the color coordinates in the XYZ colorimetric system according to JIS Z8701.

Polycarbonates, transparent polyamides, urethanes, acrylics or the like may be used as the thermoplastic resin.

The blue pigment has the lowest value for light transmittance in 570 to 610 nm, and tetraazaporphyrin compounds, azaporphyrin compounds, or the like may be used.

The pink pigment, among blue light of 380 to 500 nm, has the highest value for light transmittance in 400 to 440 nm and the lowest value for light transmittance in 480 to 520 nm, and 1,4-dihydroxyanthraquinone, violanthrone, 1-(2-nitrophenylazo)-2-naphthol, or the like may be used.

In the synthetic resin lens of the present invention, the content rate of the blue pigment is 0.001 to 0.10 wt %, preferably 0.004 to 0.005 wt %, and the content rate of the pink pigment is 0.005 to 0.15 wt %, preferably 0.008 to 0.009 wt %.

Furthermore, in the synthetic resin lens of the present invention, the content ratio of the blue pigment to the pink pigment is 4:9 to 5:8, preferably 1:2.

The synthetic resin lens of the present invention may be a synthetic resin lens comprising a silver deposited film reflecting visible light on the surface of the achromatic lens or the sheet. In this case, it is preferable to make the visible light transmittance of the lens or the sheet before comprising the deposited film 35 to 60%, and it is preferable to make the visible light transmittance of the lens or the sheet after comprising the deposited film 15 to 50%. The deposited film is a laminated film obtained by performing vacuum deposition of metal chromium, aluminum, titanium, or SiO, $SiO_2$, $TiO_2$, $Ti_3O_5$, $ZrO_2$, or the like.

The synthetic resin lens of the present invention may be a synthetic resin lens comprising a gray polarizing film having a degree of polarization of 90 to 100% on the surface of the achromatic lens or the sheet. It is preferable to make the visible light transmittance of the lens or the sheet in this case 15 to 35%. The gray polarizing film is a sheet obtained by attaching a transparent film of a polycarbonate, a triacetate, a polyamide, or the like as a protective layer on a polarizing film made of a polyvinyl alcohol.

Furthermore, the synthetic resin lens of the present invention may be a synthetic resin lens comprising a gray polarizing film having a degree of polarization of 90 to 100% on the surface of the achromatic lens or the sheet and a deposited film reflecting visible light on the surface of the gray polarizing film. In this case, it is preferable to make the visible light transmittance of the lens comprising the gray polarizing film 15 to 50%, and it is preferable to make the visible light transmittance of the lens comprising the deposited film 10 to 35%.

The synthetic resin lens of the present invention may be a synthetic resin lens comprising a transparent thermoplastic resin lens on the surface of the achromatic lens.

Furthermore, the synthetic resin lens of the present invention may be a synthetic resin lens comprising a transparent thermoplastic resin lens on the surface of the achromatic lens and the deposited film on the surface of the transparent thermoplastic resin lens.

Moreover, the synthetic resin lens of the present invention may be a synthetic resin lens comprising a transparent thermoplastic resin lens on the surface of the achromatic lens and the gray polarizing film on the surface of the transparent thermoplastic resin lens.

Even furthermore, the synthetic resin lens of the present invention may be a synthetic resin lens comprising a transparent thermoplastic resin lens on the surface of the achromatic lens; and the deposited film and the gray polarizing film on the surface of the transparent thermoplastic resin lens.

In addition, for the synthetic resin lens of the present invention, a thermoplastic resin is caused to contain a blue pigment having X: 0.25±0.02 and Y: 0.27±0.02 and a pink pigment having X: 0.39±0.02 and Y: 0.34±0.02, resulting in an achromatic lens having X: 0.28±0.02 and Y: 0.29±0.02 according to a chromaticity diagram.

Hereinafter, the synthetic resin lens of the present invention will be explained in detail based on Examples.

EXAMPLE 1

0.0450 g of a tetraazaporphyrin compound as a blue pigment and 0.0882 g of 1,4-dihydroxyanthraquinone as a pink pigment per 1 kg of a polycarbonate resin were kneaded in the polycarbonate resin to form a lens for glasses having an external diameter of 79 mm and a lens center thickness of 1.8 mm and a shield for a helmet having a thickness of 1.8 mm. The visible light transmittance of the lens for glasses and the shield for a helmet each obtained in this Example is shown in FIG. 1.

EXAMPLE 2

Chromium was vacuum-deposited on the surface of the lens and the shield each obtained in Example 1 respectively to make a silver mirror lens for sunglasses and a silver mirror shield for a helmet.

EXAMPLE 3

A gray polarizing film was attached on the surface of the lens and the shield each obtained in Example 1 respectively to make a polarizing gray lens for sunglasses and a polarizing gray shield for a helmet.

EXAMPLE 4

A gray polarizing film was attached on the surface of the lens and the shield each obtained in Example 1 respectively, and further, chromium was vacuum-deposited on the respective surfaces to make a lens for sunglasses and a shield for a helmet.

EXAMPLE 5

As a blue pigment, 0.0450 g of a tetraazaporphyrin compound, and 0.0882 g of 1,4-dihydroxyanthraquinone as a pink pigment per 1 kg of a polycarbonate resin were kneaded in the polycarbonate resin to form a sheet having a thickness of 1.0 mm. The sheet was attached on the surface of a separately formed transparent lens for glasses having an external diameter of 80 mm and a lens center thickness of 10 mm and the surface of a separately formed transparent shield for a helmet having a thickness of 2 mm respectively.

EXAMPLE 6

Chromium was vacuum-deposited on the surface of the lens and the shield each obtained in Example 5 respectively to make a silver mirror lens for sunglasses and a silver mirror shield for a helmet.

EXAMPLE 7

A gray polarizing film was attached on the surface of the lens and the shield each obtained in Example 5 respectively to make a polarizing gray lens for sunglasses and a polarizing gray shield for a helmet.

EXAMPLE 8

A gray polarizing film was attached on the surface of the lens and the shield each obtained in Example 5 respectively, and further, chromium was vacuum-deposited on the respective surfaces to make a lens for sunglasses and a shield for a helmet.

EXAMPLE 9

As a blue pigment, 0.0450 g of a tetraazaporphyrin compound, and 0.0882 g of 1,4-dihydroxyanthraquinone as a pink pigment per 1 kg of a polycarbonate resin were kneaded in the polycarbonate resin to form a sheet having a thickness of 1.2 mm. A gray polarizing film was attached on the surface of the sheet to make a polarizing gray shield for a helmet.

EXAMPLE 10

Chromium was vacuum-deposited on the surface of the gray polarizing film of the shield obtained in Example 9 to make a polarizing gray and silver mirror shield for a helmet.

The invention claimed is:

1. A synthetic resin lens wherein a thermoplastic resin is caused to contain a blue pigment having the lowest value for light transmittance in 570 to 610 nm and a pink pigment, among blue light of 380 to 500 nm, having the highest value for light transmittance in 400 to 440 nm and the lowest value for light transmittance in 480 to 520 nm, wherein a content rate of the blue pigment is 0.004 to 0.005 wt % and a content rate of the pink pigment is 0.008 to 0.009 wt % either resulting in a transparent achromatic lens having the lowest value for light transmittance in 570 to 610 nm or resulting in a sheet having the lowest value for light transmittance in 570 to 610 nm and the sheet is attached to a transparent thermoplastic resin lens.

2. The synthetic resin lens according to claim 1, wherein a content ratio of the blue pigment to the pink pigment is 1:2.

3. The synthetic resin lens according to claim 1, comprising a deposited film reflecting visible light on a surface of the lens.

4. A synthetic resin lens comprising a gray polarizing film having a degree of polarization of 90 to 100% on a surface of the lens wherein a thermoplastic resin is caused to contain a blue pigment having the lowest value for light transmittance in 570 to 610 nm and a pink pigment, among blue light of 380 to 50 nm, having the highest value for light transmittance in 400 to 440 nm and the lowest value for light transmittance in 480 to 520 nm either resulting in a transparent achromatic lens having the lowest value for light transmittance in 570 to 610 nm or resulting in a sheet having the lowest value for light transmittance in 570 to 610 nm and the sheet is attached to a transparent thermoplastic resin lens.

5. A synthetic resin comprising a deposited film reflecting visible light and a gray polarizing film having a degree of polarization of 90 to 100% on a surface of the lens wherein a thermoplastic resin is caused to contain a blue pigment having the lowest value for light transmittance in 570 to 610 nm and a pink pigment, among blue light of 380 to 500 nm, having the highest value for light transmittance in 400 to 440 nm and the lowest value for light transmittance in 480 to 520 nm, either resulting in a transparent achromatic lens having the lowest value for light transmittance in 570 to 610 nm or resulting in a sheet having the lowest value for light transmittance in 570 to 610 nm and the sheet is attached to a transparent thermoplastic resin lens.

* * * * *